United States Patent
Li et al.

(10) Patent No.: US 12,224,605 B2
(45) Date of Patent: Feb. 11, 2025

(54) SYSTEM AND METHOD FOR PARALLEL BATTERY PACK CHARGING

(71) Applicant: Lear Corporation, Southfield, MI (US)

(72) Inventors: Zongchao Li, Shanghai (CN); Yuedong Zhang, Shanghai (CN); Jiyang Liu, Shanghai (CN)

(73) Assignee: LEAR CORPORATION, Southfield, MI (US)

( * ) Notice: Subject to any disclaimer, the term of this patent is extended or adjusted under 35 U.S.C. 154(b) by 519 days.

(21) Appl. No.: 17/453,778

(22) Filed: Nov. 5, 2021

(65) Prior Publication Data
US 2022/0209549 A1    Jun. 30, 2022

(30) Foreign Application Priority Data
Dec. 29, 2020  (CN) .......................... 202011594393.5

(51) Int. Cl.
    H02J 7/00        (2006.01)
(52) U.S. Cl.
    CPC .......... *H02J 7/0019* (2013.01); *H02J 7/0024* (2013.01); *H02J 7/007182* (2020.01)
(58) Field of Classification Search
    CPC ...... H02J 7/0013; H02J 7/0024; H02J 7/0019; H02J 7/0014; H02J 7/00304; H02J 7/007
    See application file for complete search history.

(56) References Cited

U.S. PATENT DOCUMENTS

| | | | |
|---|---|---|---|
| 8,214,097 B2 | 7/2012 | Severinsky et al. | |
| 2014/0062387 A1* | 3/2014 | Kim | H02J 7/0036 320/137 |
| 2017/0240063 A1 | 8/2017 | Herke et al. | |
| 2017/0346334 A1* | 11/2017 | Mergener | H02J 7/0025 |
| 2019/0089167 A1* | 3/2019 | Normand | B60L 58/20 |
| 2019/0359067 A1* | 11/2019 | Hu | H02J 7/0019 |
| 2020/0062140 A1* | 2/2020 | Zhou | B60L 50/64 |
| 2020/0244075 A1* | 7/2020 | Park | H02J 7/007182 |
| 2021/0119277 A1* | 4/2021 | Kim | H01M 10/482 |
| 2021/0167473 A1* | 6/2021 | Joos | H01M 10/48 |
| 2023/0064027 A1* | 3/2023 | Hallberg | H02J 9/061 |
| 2023/0396077 A1* | 12/2023 | Atmur | H01M 10/425 |

FOREIGN PATENT DOCUMENTS

| | | |
|---|---|---|
| DE | 102016010839 A1 | 3/2017 |
| DE | 102020003239 A1 | 7/2020 |
| WO | 2019141493 A1 | 7/2019 |

\* cited by examiner

*Primary Examiner* — Samuel Berhanu
(74) *Attorney, Agent, or Firm* — BROOKS KUSHMAN P.C.

(57) ABSTRACT

A battery management system is provided with a first charging circuit including a first switch to connect a first battery pack to a power source. A second charging circuit includes a second switch to connect a second battery pack to the power source, wherein the second charging circuit is arranged in parallel with the first charging circuit. A discharge circuit includes a discharge switch to connect the first battery pack and the second battery pack in series. A processor is programmed to: open the discharge switch; receive input indicative of a first battery voltage and a second battery voltage; close the first switch and open the second switch in response to the first battery voltage being less than the second battery voltage; and close the first switch and close the second switch in response to the first battery voltage being approximately equal to the second battery voltage.

16 Claims, 4 Drawing Sheets

SYSTEM AND METHOD FOR PARALLEL BATTERY PACK CHARGING

CROSS-REFERENCE TO RELATED APPLICATION

This application claims foreign priority benefits under 35 U.S.C. § 119(a)-(d) to CN patent application 2020 11 594 3935 filed Dec. 29, 2020, the disclosure of which is hereby incorporated by reference in its entirety.

TECHNICAL FIELD

One or more embodiments relate to a battery management system for charging a battery assembly that includes multiple battery packs.

BACKGROUND

Electrified vehicles, including pure electric vehicles and hybrid electric vehicles, include a high-voltage battery pack that is used for propulsion or "traction" of the vehicle, and may be referred to as a traction battery. Such electrified vehicles include power electronics for converting power supplied to and from the traction battery that are designed to accommodate a maximum voltage of approximately 400 Volts.

SUMMARY

In one embodiment, a battery management system is provided with a first battery pack and a second battery pack. A first charging circuit includes a first switch to connect the first battery pack to a power source to enable charging. A second charging circuit includes a second switch to connect the second battery pack to the power source to enable charging, wherein the second charging circuit is arranged in parallel with the first charging circuit. A processor is programmed to: receive input indicative of a first battery voltage and of a second battery voltage; close the first switch and open the second switch, to enable charging of the first battery pack at a first charging current and disable charging of the second battery pack, in response to the first battery voltage being less than the second battery voltage; and close the first switch and close the second switch, to enable charging of the first battery pack and the second battery pack in parallel, in response to the first voltage being approximately equal to the second battery voltage.

Implementations may include one or more of the following features. For instance, the first battery pack and the second battery pack may be adapted to provide direct current (DC) power at a maximum voltage of approximately 400 Volts. The battery management system may include a discharge circuit with a discharge switch to connect the first battery pack and the second battery pack in series to collectively provide DC power at a maximum voltage of approximately 800 Volts.

As another example, the battery management system may include a pre-charging switch and a resistor connected in series, wherein the pre-charging switch, together with the resistor are connected in parallel with the first switch. The processor may be further programmed to: close the pre-charging switch and open the first switch to enable pre-charging of the first battery pack; and in response to a pre-charging voltage exceeding a pre-charging voltage threshold value, open the pre-charging switch and close the first switch to enable charging of the first battery pack.

Additionally, the processor may be further programmed to reduce the first charging current to a second charging current in response to the first charging current exceeding a charging current threshold value and/or a difference between the first battery voltage and the second battery voltage being less than a predetermined threshold value. Further, the second charging current may be approximately equal to one half of the first charging current. The processor may be further programmed to reduce the second charging current to a third charging current in response to a difference between the first battery voltage and the second battery voltage being less than the predetermined threshold value, wherein the third charging current is approximately equal to one half of the second charging current.

As another example, the processor may be further programmed to close the second switch and open the first switch to enable charging of the second battery pack at a second battery pack charging current in response to input indicative of the second battery voltage being less than the first battery voltage. The battery management system may include a pre-charging switch and a resistor connected in series, wherein the pre-charging switch, together with the resistor, are connected in parallel with the second switch, wherein the processor is further programmed to: close the pre-charging switch and open the second switch to enable pre-charging of the second battery pack; and in response to a pre-charging voltage exceeding a pre-charging voltage threshold value, open the pre-charging switch and close the second switch to enable charging of the second battery pack. Further, the processor may be further programmed to reduce the second battery pack charging current in response to a difference between the second battery voltage and the first battery voltage being less than a predetermined threshold value.

In another embodiment, a battery management system is provided with a first charging circuit including a first switch to connect a first battery pack to a power source. A second charging circuit includes a second switch to connect a second battery pack to the power source, wherein the second charging circuit is arranged in parallel with the first charging circuit. A discharge circuit includes a discharge switch to connect the first battery pack and the second battery pack in series. A processor is programmed to: open the discharge switch; receive input indicative of a first battery voltage and a second battery voltage; close the first switch and open the second switch in response to the first battery voltage being less than the second battery voltage; and close the first switch and close the second switch in response to the first battery voltage being approximately equal to the second battery voltage.

Implementations may include one or more of the following features. For instance, the battery management system may include a pre-charging switch and a resistor connected in series, wherein the pre-charging switch, together with the resistor, are connected in parallel with the first switch, wherein the processor is further programmed to: close the pre-charging switch and open the first switch to enable pre-charging of the first battery pack; and in response to a pre-charging voltage exceeding a pre-charging voltage threshold value, open the pre-charging switch and close the first switch to enable charging of the first battery pack. The processor may be further programmed to reduce a first charging current to a second charging current in response to a difference between the first battery voltage and the second battery voltage being less than a predetermined threshold value.

In yet another embodiment a method for charging a battery assembly is provided. A discharge switch connected between a first battery pack and a second battery pack is opened. Input indicative of a first battery voltage and a second battery voltage is received. A first switch to connect the first battery pack to a power source is closed to enable charging of the first battery pack at a first charging current in response to the first battery voltage being less than the second battery voltage. The first switch and a second switch are closed to connect the second battery pack to the power source, to enable charging of the first battery pack and the second battery pack in parallel, in response to the first battery voltage being approximately equal to the second battery voltage.

Implementations may include one or more of the following features. For instance, a pre-charging switch and a resistor may be connected in series, wherein the pre-charging switch, together with the resistor, are connected in parallel with the first switch. The pre-charging switch is closed, and the first switch is opened to enable pre-charging of the first battery pack. The pre-charging switch is opened, and the first switch is closed to enable charging of the first battery pack, in response to a pre-charging voltage exceeding a pre-charging voltage threshold value.

The first charging current may be reduced to a second charging current in response to a difference between the first battery voltage and the second battery voltage being less than a predetermined threshold value.

As another example, in response to input indicative of the second battery voltage being less than the first battery voltage the second switch may be closed, and the first switch may be opened to enable charging of the second battery pack at a second charging current.

As another example, a pre-charging switch and a resistor may be connected in series, wherein the pre-charging switch, together with the resistor, are connected in parallel with the second switch. The pre-charging switch is closed, and the second switch is opened to enable pre-charging of the second battery pack. The pre-charging switch is opened, and the second switch is closed to enable charging of the second battery pack, in response to a pre-charging voltage exceeding a pre-charging voltage threshold value. The second charging current may be reduced to a third charging current in response to a difference between the second battery voltage and the first battery voltage being less than a predetermined threshold value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
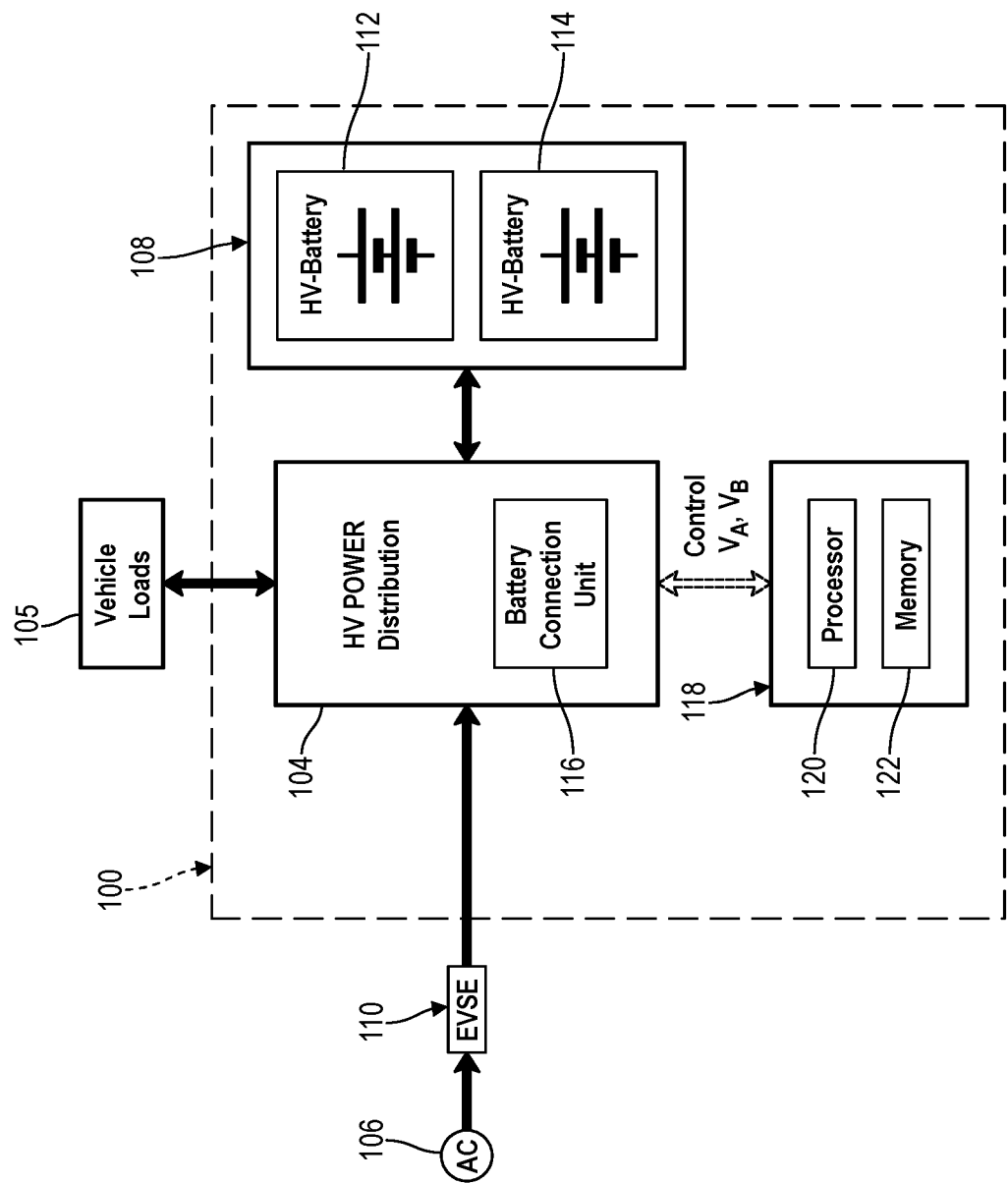
FIG. 1 is a schematic diagram of a battery management system including a high-voltage (HV) power distribution module, a first battery pack, and a second battery pack, according to one or more embodiments.

With reference to FIG. 1, a battery management system is illustrated in accordance with one or more embodiments and generally referenced by numeral 100. The battery management system 100 is included in a vehicle (not shown) and includes a high-voltage (HV) power distribution module 104. The HV power distribution module 104 electrically connects an external power supply 106 to a traction battery assembly 108 to facilitate charging. The HV power distribution module 104 also connects to vehicle loads 105, e.g., traction motors, heaters, etc., for discharging the traction battery assembly 108.

The external power supply 106 is electrically coupled to electric vehicle supply equipment (EVSE) 110, e.g., a charger or a charging station. The external power supply 106 is an electrical power distribution network or grid as provided by an electric utility company, according to one or more embodiments. The EVSE 110 includes circuitry and controls to regulate and manage the transfer of energy between the external power supply 106 and the battery management system 100. The external power supply 106 provides AC electric power to the EVSE 110, which converts the AC electric power to DC electrical power. Typical electrified vehicles include a traction battery with a maximum voltage of approximately 400 Volts, accordingly the EVSE 110 is designed to provide charging power for a 400 Volt HV battery.

The traction battery assembly 108 includes two battery packs, a first battery pack 112 and a second battery pack 114, that are connected in series to provide battery assembly with an output voltage that is larger than the voltage of each individual battery pack. In one embodiment, each battery pack 112, 114 provides a maximum voltage of approximately 400 Volts, and the battery assembly 108 provides a maximum voltage of approximately 800 Volts. The HV power distribution module 104 also includes a battery connection unit 116 that connects the traction battery assembly 108 to the EVSE 110 in different configurations, e.g., series and parallel, to facilitate charging the traction battery assembly 108 at a lower voltage, e.g., charging an 800 Volt traction battery assembly 108 with a 400 Volt EVSE 110. The battery management system 100 also includes a controller 118, including a processor 120 and memory 122, for controlling the battery connection unit 116. The controller 118 conditions the power supplied from the external power supply 106 to provide the proper voltage and current levels to the traction battery assembly 108 to facilitate charging.

Figure 2:
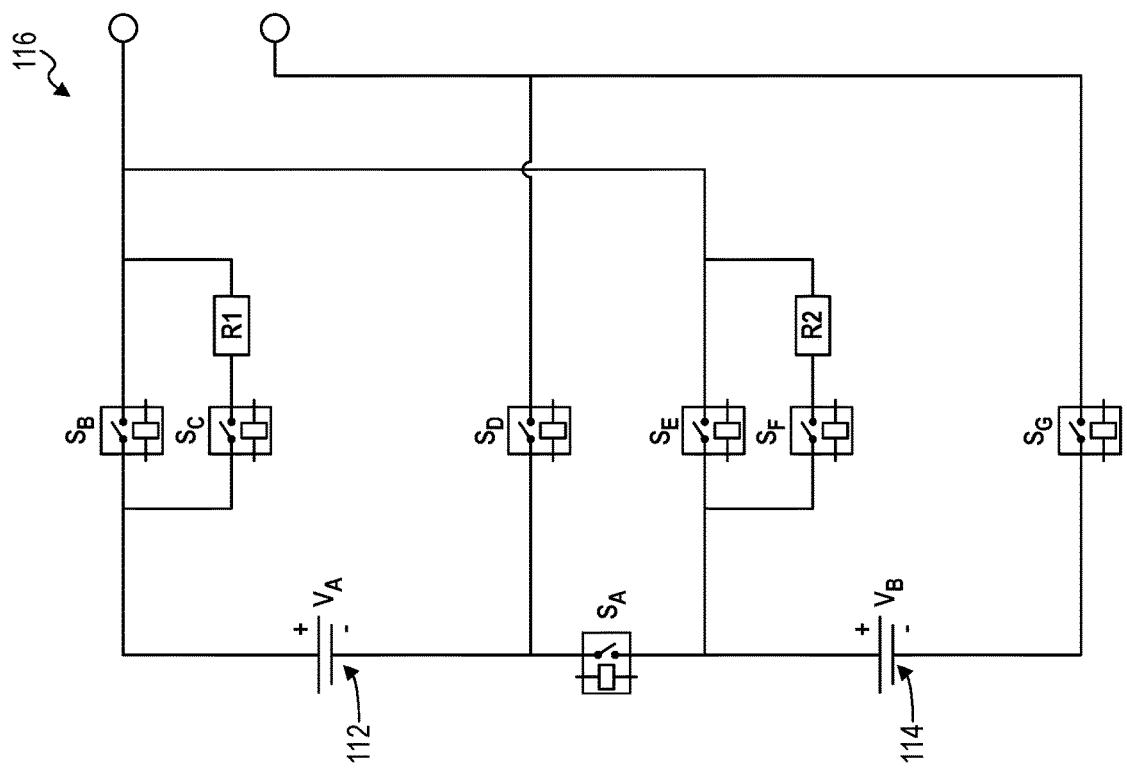
FIG. 2 is a circuit diagram illustrating a battery connection unit of the HV power distribution module of FIG. 1.

Referring to FIG. 2, the battery connection unit 116 includes a plurality of switches ($S_A$-$S_G$) that are controlled to open and close to provide numerous battery charging and discharging circuits or configurations. In one or more embodiments, each switch ($S_A$-$S_G$) is a relay, that is rated to withstand the high-voltage and high-current present on the circuits. The controller 118 provides a control signal (CONTROL) to the battery connection unit 116, as shown in FIG. 1, to individually control each switch ($S_A$-$S_G$). The controller 118 receives input indicative of the accumulated voltage ($V_A$) of the first battery pack 112 and the accumulated voltage ($V_B$) of the second battery pack 114, as shown in FIG. 1. The controller 118 may receive such voltage signals directly from battery sensors or from one or more other vehicle controllers over a vehicle bus.

Figure 3:
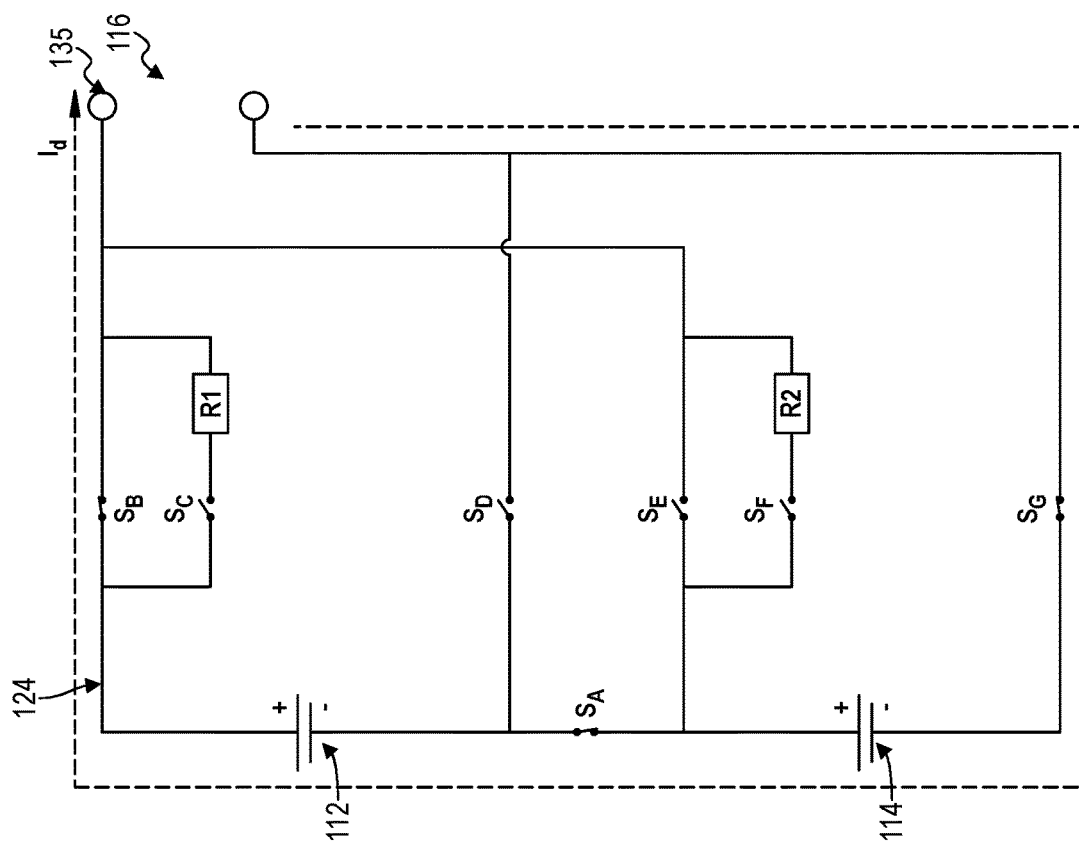
FIG. 3 is a circuit diagram illustrating the battery connection unit of FIG. 2 arranged in a discharge configuration with both battery packs connected in series.

With reference to FIG. 3, the battery connection unit 116 provides a discharge circuit 124 for supplying power from the first battery pack 112 and the second battery pack 114 to the vehicle loads 105 (shown in FIG. 1). The discharge circuit 124 includes: switch $S_G$ that is connected in the path to the second battery pack 114, switch $S_A$ that is connected in series between the second battery pack 114 and the first battery pack 112, and switch $S_B$ that is connected in a discharge path downstream of the first battery pack 112. The discharge current ($I_d$) through the discharge circuit 124 is depicted by a dashed line in FIG. 3.

In one or more embodiments, the controller 118 controls switch $S_C$, switch $S_G$, and switch $S_A$, to close, to enable pre-charging of the first battery pack 112 and the second battery pack 114 until a pre-charging voltage exceeds a pre-charging threshold value. The pre-charging voltage is indicative of a capacitive load voltage, and is measured at point 135, according to one or more embodiments. Next the controller 118 controls switch $S_C$ to open and switch $S_B$ to close. Then the controller 118 begins discharging the first battery pack 112 and the second battery pack 114.

Figure 4:
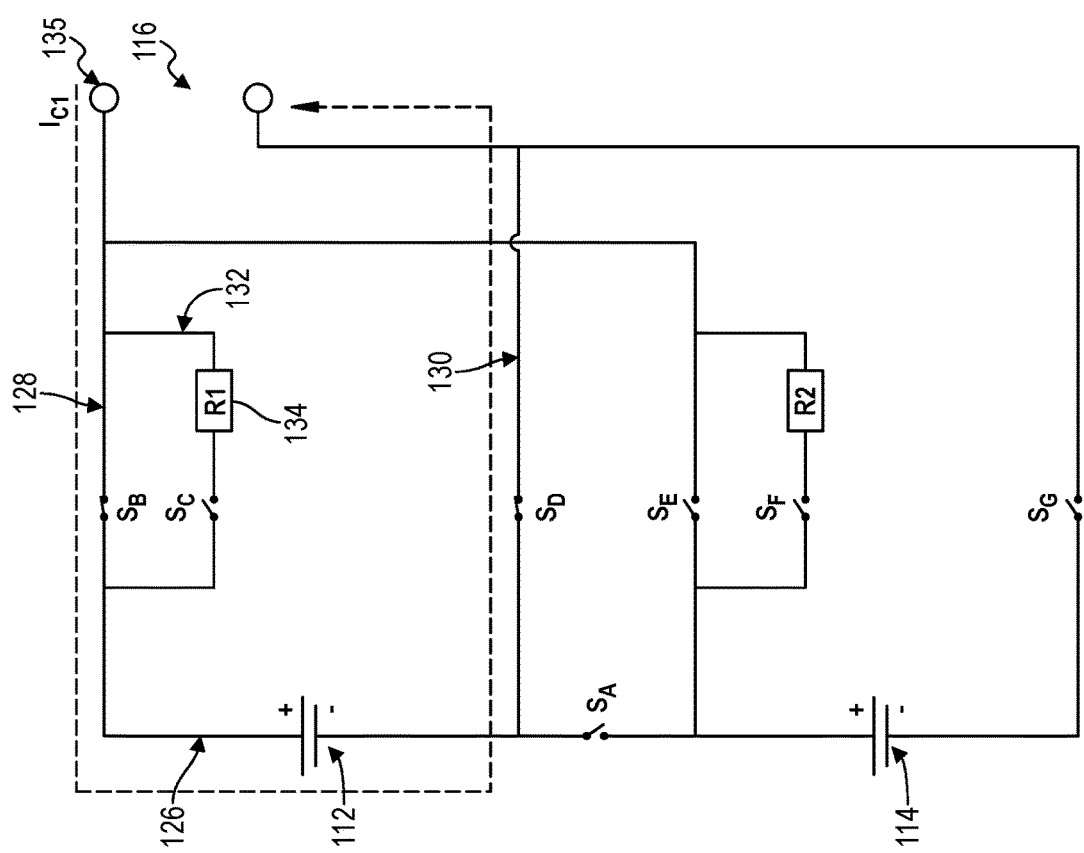
FIG. 4 is a circuit diagram illustrating the battery connection unit of FIG. 2 arranged in a first battery charging configuration for charging the first battery pack.

Referring to FIG. 4, the battery connection unit 116 includes a first charging circuit 126 for charging the first battery pack 112. The first charging circuit 126 connects the first battery pack 112 to the external power supply 106 and the EVSE 110 (shown in FIG. 1) to receive power. The first charging circuit 126 includes a primary charging path 128 and a return path 130. The primary charging path 128 extends to the first battery pack 112 and includes switch $S_B$. The return path 130 extends from the first battery pack 112 and includes switch $S_D$. The first charging circuit 126 also includes a pre-charging path 132, including switch $S_C$ and a first resistor 134 that are connected in series. Switch $S_C$, together with the first resistor 134, are connected in parallel with switch $S_B$. The first resistor 134 is equal to approximately 30-50 Ohms, according to one or more embodiments. The pre-charging path 132 is used to avoid a large inrush current when the first battery pack 112 is connected to a capacitive load directly, e.g., a traction motor.

The controller 118 controls switch $S_B$, switch $S_C$, and switch $S_D$ to open and close individually to enable and disable charging of the first battery pack 112. In one or more embodiments, the controller 118 controls switch $S_C$ and switch $S_D$ to close, to enable pre-charging of the first battery pack 112 until a pre-charging voltage exceeds a pre-charging threshold value. The pre-charging voltage is indicative of a capacitive load voltage, and is measured at point 135, according to one or more embodiments. Next the controller 118 controls switch $S_C$ to open and switch $S_B$ to close. Then the controller 118 begins charging the first battery pack 112 with a first charging current ($I_{c1}$), which is depicted by a dashed line in FIG. 4.

Figure 5:
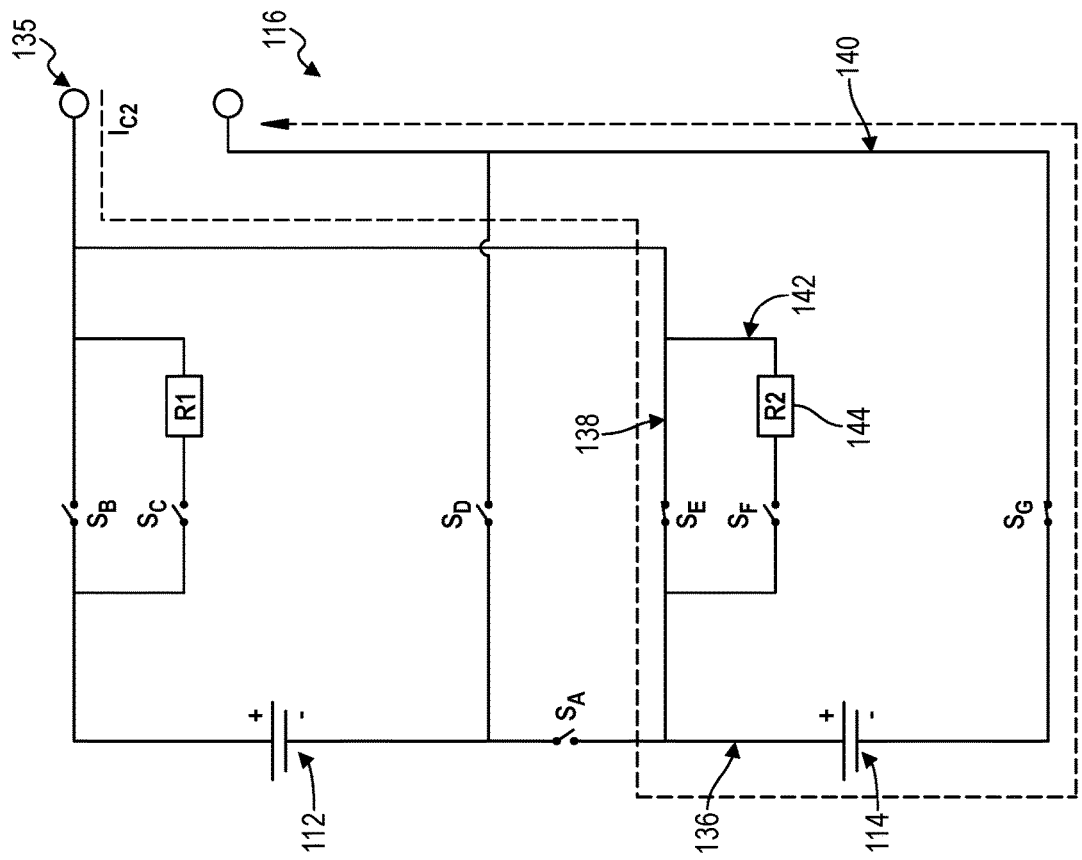
FIG. 5 is a circuit diagram illustrating the battery connection unit of FIG. 2 arranged in a second battery charging configuration for charging the second battery pack.

With reference to FIG. 5, the battery connection unit 116 includes a second charging circuit 136 for charging the second battery pack 114. The second charging circuit 136 connects the second battery pack 114 to the external power supply 106 and the EVSE 110 (shown in FIG. 1) to receive power. The second charging circuit 136 includes a primary charging path 138 and a return path 140. The primary charging path 138 extends to the second battery pack 114 and includes switch $S_E$. The return path 140 extends from the second battery pack 114 and includes switch $S_G$. The second charging circuit 136 also includes a pre-charging path 142, including switch $S_F$ and a second resistor 144 that are connected in series. Switch $S_F$, together with the second resistor 144 are connected in parallel with switch $S_E$. The pre-charging path 142 is used to avoid a large inrush current when the second battery pack 114 is connected to a capacitive load directly.

The controller 118 controls switch $S_E$, switch $S_F$, and switch $S_G$ to open and close individually to enable and disable charging of the second battery pack 114. In one or more embodiments, the controller 118 controls switch $S_F$ and switch $S_G$ to close, to enable pre-charging of the second battery pack 114 until a pre-charging voltage exceeds a pre-charging threshold value. The pre-charging voltage is indicative of a capacitive load voltage, and is measured at point 135, according to one or more embodiments. Next the controller 118 controls switch $S_F$ to open and switch $S_E$ to close. Then the controller 118 begins charging the second battery pack 114 with a second charging current ($I_{c2}$), which is depicted by a dashed line in FIG. 5.

Figures 6, 7:
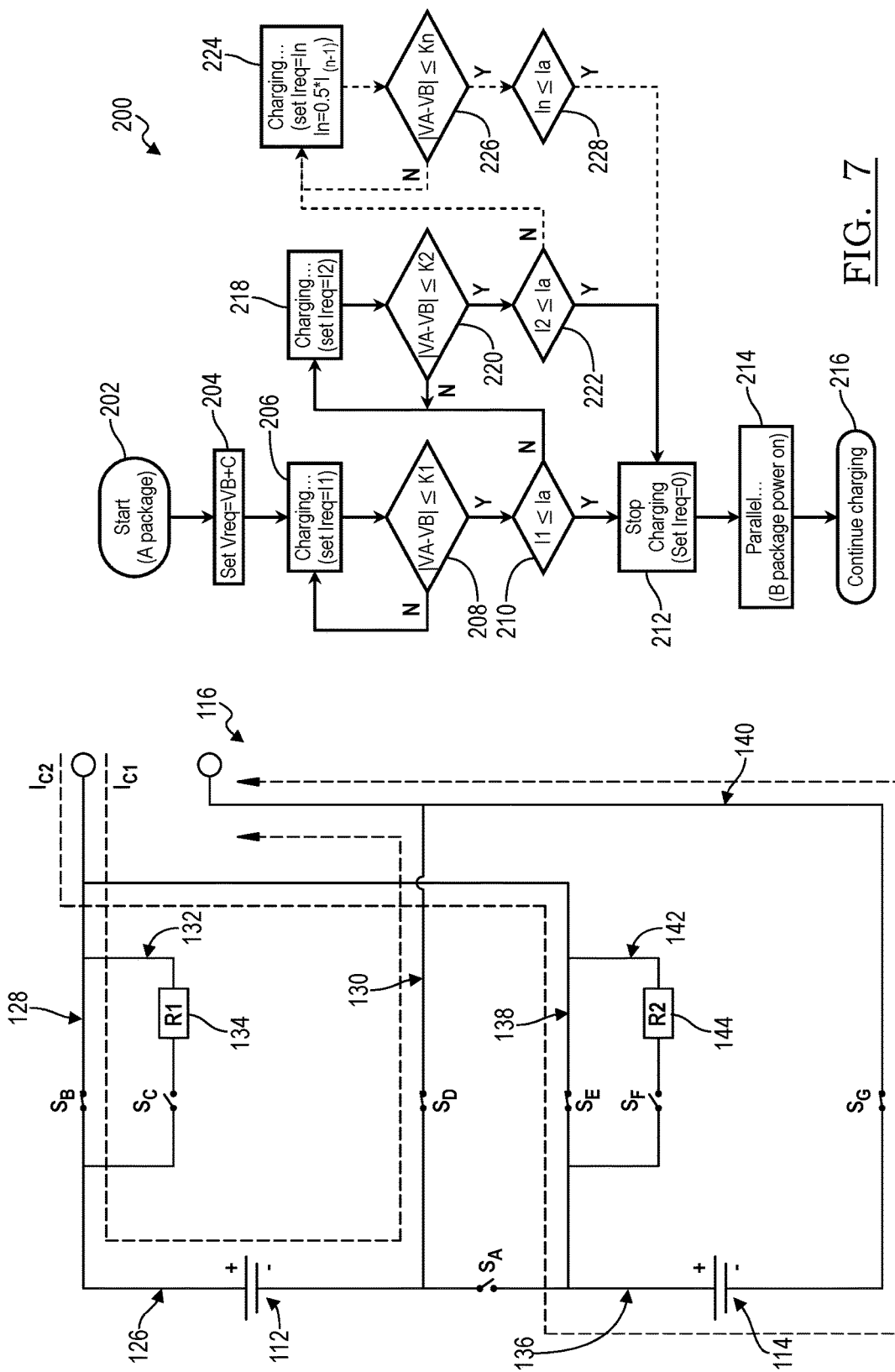
FIG. 6 is a circuit diagram illustrating the battery connection unit of FIG. 2 arranged in a parallel charging configuration with both battery packs connected in parallel.
FIG. 7 is a flow chart illustrating a method for charging the battery assembly of FIG. 1.

Referring to FIG. 6, the battery connection unit 116 may be controlled to charge the first battery pack 112 and the second battery pack 114 in parallel. The controller 118 controls switch $S_B$ and switch $S_D$ to close to enable charging of the first battery pack 112 with the first charging current ($I_{c1}$), as described above with reference to FIG. 4. The controller 118 also controls switch $S_E$ and switch $S_G$ to close to enable charging of the second battery pack 114 with the second charging current ($I_{c2}$), as described above with reference to FIG. 5.

With reference to FIG. 7, a method for charging a battery assembly is illustrated in accordance with one or more embodiments and generally referenced by numeral 200. The method 200 is implemented using software code contained within the controller 118 according to one or more embodiments. While the method is described using flowcharts that are illustrated with a number of sequential steps, one or more steps may be omitted and/or executed in another manner in one or more other embodiments. In other embodiments, the software code is distributed among multiple controllers, e.g., the controller 118 and one or more vehicle controllers (not shown).

Although the controller 118 is shown as a single controller, it may contain multiple controllers, or may be embodied as software code within one or more other controllers. The controller 118 generally includes any number of microprocessors, ASICs, ICs, memory (e.g., FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. The controller 118, also includes predetermined data, or "look up tables" that are stored within memory, according to one or more embodiments.

At step 202, the controller 118 receives input that indicates that the voltage of one battery pack is greater than the other battery pack. Then the controller 118 starts charging the battery pack having the lower voltage. In the embodiment illustrated in FIG. 7, the first battery pack 112 has a lower voltage than the second battery pack 114, i.e., $V_A<V_B$, and the controller 118 controls the switches of the battery connection unit 116 to enable the first charging circuit 126, as described with reference to FIG. 4.

At step 204, the controller 118 sets the requested charging voltage (Vreq). The controller 118 may determine the requested charging voltage (Vreq) based on the sum of the voltage of the other battery pack, i.e., $V_B$, and a predetermined value (C) to account for inefficiencies, e.g., line losses, connector losses, etc. (Vreq=$V_B$+C). In one or more embodiments, C is equal to a value between 4-5 Volts. At step 206, the controller 118 sets the requested charging current (Ireq) to a first predetermined current value (I1).

At step 208, the controller 118 compares $V_A$ to $V_B$. The controller 118 compares the absolute value of the difference between $V_A$ and $V_B$ to a predetermined threshold value (K1) to determine if the difference is less than or equal to K1 ($|V_A-V_B|\leq K1$). If the determination at step 208 is negative, the controller 118 returns to step 206 to continue charging the first battery pack 112 at I1. If the determination at step 208 is positive, the controller 118 proceeds to step 210.

At step 210, the controller 118 compares the measured charging current I1 to a charging current threshold value (Ia) to determine if I1 is less than or equal to Ia. In one or more embodiments, Ia is equal to a current value between 10 A-15 A. If the determination at step 210 is positive, i.e., (I1≤Ia), then the controller 118 proceeds to step 212 and stops charging the first battery pack 112 by setting Ireq equal to zero.

At step 214, the controller 118 controls the switches of the battery connection unit 116 to enable parallel charging of the first battery pack 112 and the second battery pack 114 as described with reference to FIG. 6. At step 216, the controller 118 continues charging the first battery pack 112 and the second battery pack 114 in parallel until the first battery 112 or the second battery 114 reaches a charging limit, such as a state of charge limit or a voltage limit, e.g., 400 Volts. Then the controller 118 stops charging the battery packs 112, 114.

If the determination at step 210 is negative, i.e., I1 is greater than Ia, the controller 118 proceeds to step 218 to reduce the charging current. If I1 is greater than Ia, this indicates that the accumulated voltage of the first battery pack ($V_A$) may be greater than the real voltage of the first battery pack 112 because a high current through resistance, e.g., line resistance, results in a high voltage drop, and therefore the determination at step 208 might have not been correct. At step 218, the controller 118 sets the requested charging current (Ireq) to a second predetermined current value (I2) that is less than I1. In one or more embodiments, I2 is a value that is equal to approximately half of I1.

At step 220, the controller 118 compares $V_A$ to $V_B$. The controller 118 compares the absolute value of the difference between $V_A$ and $V_B$ to a predetermined threshold value (K2) to determine if the difference is less than or equal to K2 ($|V_A-V_B|\leq K2$). K2 may be equal to K1, according to one or more embodiments. If the determination at step 220 is negative, the controller 118 returns to step 218 to continue charging the first battery pack 112 at I2. If the determination at step 220 is positive, the controller 118 proceeds to step 222.

At step 222, the controller 118 compares the charging current I2 to the charging current threshold value (Ia) to determine if I2 is less than or equal to Ia. If I2 is less than or equal to Ia, then the controller 118 proceeds to step 212 and stops charging the first battery pack 112. If not, i.e., if I2 is greater than Ia, the controller proceeds to step 224 to further reduce the charging current.

At step 224, the controller 118 sets the requested charging current (Ireq) to a third predetermined current value (In) that is less than I2. In one or more embodiments, In is a value that is equal to approximately half of I2.

At step 226, the controller 118 compares $V_A$ to $V_B$ to determine if the absolute value of the difference between $V_A$ and $V_B$ is less than or equal to K3. K3 may be equal to K1, according to one or more embodiments. If the determination at step 226 is negative, the controller 118 returns to step 224 to continue charging the first battery pack 112 at I3. If the determination at step 226 is positive, the controller 118 proceeds to step 228 to determine if In is less than or equal to Ia. If so, then the controller 118 proceeds to step 212 and stops charging the first battery pack 112. The method 200 may include multiple additional steps, like steps 224-228, to further reduce the charging current until the charging current is less than Ia.

The method 200 illustrates an example in which the first battery pack 112 has a lower voltage than the second battery pack 114, i.e., $V_A<V_B$, however the method 200 may be modified to accommodate a scenario in which the second battery pack 114 has a lower voltage than the first battery pack 112.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery management system, comprising:
    a first battery pack;
    a second battery pack;
    a first charging circuit with a first switch to connect the first battery pack to a power source to enable charging;
    a second charging circuit with a second switch to connect the second battery pack to the power source to enable charging, wherein the second charging circuit is arranged in parallel with the first charging circuit; and
    a processor programmed to:
       receive an input indicative of a first battery voltage and of a second battery voltage;
       close the first switch and open the second switch, to enable charging of the first battery pack at a first charging current and disable charging of the second battery pack, in response to the first battery voltage being less than the second battery voltage;
       reduce the first charging current to a second charging current in response to a difference between the first battery voltage and the second battery voltage being less than a predetermined threshold value and the first charging current exceeding a charging current threshold value; and close the first switch and the second switch, to enable charging of the first battery pack and the second battery pack in parallel, in response to the first battery voltage being approximately equal to the second battery voltage.

2. The battery management system of claim 1, wherein the first battery pack and the second battery pack are each adapted to provide DC power at a maximum voltage of approximately 400 Volts.

3. The battery management system of claim 1 further comprising a discharge circuit with a discharge switch to connect the first battery pack and the second battery pack in series to collectively provide DC power at a maximum voltage of approximately 800 Volts.

4. The battery management system of claim 1 further comprising a pre-charging switch and a resistor connected in series, wherein the pre-charging switch, together with the resistor are connected in parallel with the first switch, wherein the processor is further programmed to:
close the pre-charging switch and open the first switch to enable pre-charging of the first battery pack; and
in response to a pre-charging voltage exceeding a pre-charging voltage threshold value, open the pre-charging switch and close the first switch to enable charging of the first battery pack.

5. The battery management system of claim 1, wherein the second charging current is approximately equal to one half of the first charging current.

6. The battery management system of claim 1, wherein the processor is further programmed to reduce the second charging current to a third charging current in response to a difference between the first battery voltage and the second battery voltage being less than the predetermined threshold value, wherein the third charging current is approximately equal to one half of the second charging current.

7. The battery management system of claim 1, wherein the processor is further programmed to close the second switch and open the first switch to enable charging of the second battery pack at a second battery pack charging current in response to input indicative of the second battery voltage being less than the first battery voltage.

8. The battery management system of claim 7 further comprising a pre-charging switch and a resistor connected in series, wherein the pre-charging switch, together with the resistor, are connected in parallel with the second switch, wherein the processor is further programmed to:
close the pre-charging switch and open the second switch to enable pre-charging of the second battery pack; and
in response to a pre-charging voltage exceeding a pre-charging voltage threshold value, open the pre-charging switch and close the second switch to enable charging of the second battery pack.

9. The battery management system of claim 7, wherein the processor is further programmed to reduce the second battery pack charging current in response to a difference between the second battery voltage and the first battery voltage being less than a predetermined threshold value.

10. A battery management system, comprising:
a first charging circuit with a first switch to connect a first battery pack to a power source;
a second charging circuit with a second switch to connect a second battery pack to the power source, wherein the second charging circuit is arranged in parallel with the first charging circuit;
a discharge circuit with a discharge switch to connect and disconnect the first battery pack and the second battery pack in series; and
a processor programmed to:
open the discharge switch;
receive input indicative of a first battery voltage and a second battery voltage;
close the first switch and open the second switch, to enable charging of the first battery pack at a first charging current, in response to the first battery voltage being less than the second battery voltage;
reduce the first charging current to a second charging current in response to a difference between the first battery voltage and the second battery voltage being less than a predetermined threshold value and the first charging current exceeding a charging current threshold value; and
close the first switch and close the second switch, to enable charging of the first battery pack and the second battery pack in parallel, in response to the first battery voltage being approximately equal to the second battery voltage.

11. The battery management system of claim 10 further comprising a pre-charging switch and a resistor connected in series, wherein the pre-charging switch, together with the resistor, are connected in parallel with the first switch, wherein the processor is further programmed to:
close the pre-charging switch and open the first switch to enable pre-charging of the first battery pack; and
in response to a pre-charging voltage exceeding a pre-charging voltage threshold value, open the pre-charging switch and close the first switch to enable charging of the first battery pack.

12. A method for charging a battery assembly, comprising:
opening a discharge switch connected between a first battery pack and a second battery pack;
receiving input indicative of a first battery voltage and a second battery voltage;
closing a first switch to connect the first battery pack to a power source to enable charging of the first battery pack at a first charging current in response to the first battery voltage being less than the second battery voltage;
reducing the first charging current to a second charging current in response to a difference between the first battery voltage and the second battery voltage being less than a predetermined threshold value and the first charging current exceeding a charging current threshold value; and
closing the first switch and closing a second switch to connect the second battery pack to the power source, to enable charging of the first battery pack and the second battery pack in parallel, in response to the first battery voltage being approximately equal to the second battery voltage.

13. The method of claim 12 further comprising:
providing a pre-charging switch and a resistor connected in series, wherein the pre-charging switch, together with the resistor, are connected in parallel with the first switch;
closing the pre-charging switch and opening the first switch to enable pre-charging of the first battery pack; and
in response to a pre-charging voltage exceeding a pre-charging voltage threshold value, opening the pre-charging switch and closing the first switch to enable charging of the first battery pack.

14. The method of claim 12 further comprising closing the second switch and opening the first switch to enable charging of the second battery pack at a third charging current in response to input indicative of the second battery voltage being less than the first battery voltage.

15. The method of claim 14 further comprising reducing the third charging current to a fourth charging current in response to a difference between the second battery voltage and the first battery voltage being less than a predetermined threshold value.

16. The method of claim 12 further comprising:
providing a pre-charging switch and a resistor connected in series, wherein the pre-charging switch, together with the resistor, are connected in parallel with the second switch;
closing the pre-charging switch and opening the second switch to enable pre-charging of the second battery pack; and
in response to a pre-charging voltage exceeding a pre-charging voltage threshold value, opening the pre-charging switch and closing the second switch to enable charging of the second battery pack.

* * * * *